3,484,389
PREPARATION OF POLYOXADIAZOLES
Yoshio Iwakura and Masayasu Akiyama, Tokyo, Japan, assignors to Mitsubishi Petrochemical Co., Ltd., Tokyo, Japan, a corporation of Japan
No Drawing. Filed Feb. 3, 1966, Ser. No. 524,852
Claims priority, application Japan, Feb. 9, 1965, 40/6,848, 40/6,849
Int. Cl. C08f 13/00
U.S. Cl. 260—2
3 Claims

ABSTRACT OF THE DISCLOSURE

Polyoxadiazoles are prepared by 1,3-dipolar cycloaddition of aromatics containing both nitrile and nitrile N-oxide groups.

---

The present invention relates to a polymer derived from an aromatic compound having a nitrile-N-oxide group and a process for the production thereof. More particularly, it relates to an addition polymer which is produced by polymerizing a monomeric compound of the formula:

$$O \leftarrow N \equiv C - Ar - CN$$

wherein Ar is a divalent aromatic group which may have one or more substituents, for example, a phenylene group or a naphthylene group, and a process for the production thereof.

In accordance with one aspect of the present invention, an object of the present invention is to provide a novel process for producing a polyoxadiazole by effecting addition polymerization of an aromatic compound having both a nitrile group and a nitrile-N-oxide group in its molecule in solid state.

For many years, we have attempted to form heterocyclic rings by effecting addition reactions of aromatic nitrile-N-oxide compounds with various unsaturated compounds, especially by effecting 1,3-dipolar cycloaddition reaction of aromatic nitrile-N-oxide compounds with unsaturated compounds under various reaction conditions. Unfortunately, however, we have been unsuccessful in obtaining the polyoxadiazole in purified form by effecting a polyaddition reaction in solvents of aromatic dinitrile-N-oxides having the formula:

$$O \leftarrow N \equiv C - Ar - C \equiv N \rightarrow O$$

with aromatic dinitrile compounds having the formula:

$$N \equiv C - Ar - C \equiv N$$

wherein Ar is as defined above.

The reason is that since the reactivities of nitrile-N-oxide groups with each other are greater than those of nitrile-N-oxide groups with nitrile compounds, aromatic dinitrile-N-oxide compounds tend to polymerize by themselves to form polymers having a furoxan ring, rather than reacting with the nitrile compounds.

One of the processes of the present invention is based on the discovery that when aromatic compounds having both a nitrile-N-oxide group and a nitrile group in their molecules, for example, p-cyanobenzonitrile-N-oxide and the like are allowed to stand at room temperature in the solid state, the infrared spectrum thereof changes with the lapse of time and a polymer is formed after standing for a long period of time. That is to say, according to the process, there is provided a novel process for producing a polyoxadiazole by polymerizing an aromatic compound having both a nitrile group and a nitrile-N-oxide group in its molecule in the solid state without using any solvent.

It is quite surprising, judging from the general conception of polyaddition reaction which have heretofore prevailed, that a polyaddition reaction of an aromatic compound having both a nitrile-N-oxide group and a nitrile group in its molecule may proceed in solid state without using any solvent to afford the poly-oxadiazole.

Aromatic compounds having both a nitrile group and a nitrile-N-oxide group in their molecules which may be used in the process are those represented by the formula:

$$N \equiv C - Ar - C \equiv N \rightarrow O$$

wherein Ar is as defined above and may be exemplified by p-cyanobenzonitrile-N-oxide, m-cyanobenzonitrile-N-oxide, 4-(p-cyanobenzyl)benzonitrile-N-oxide, 5-cyano-1-naphthonitrile-N-oxide and the like.

Generally speaking, these compounds can be produced by dehydrochlorination of aromatic compounds having a nitrile group and a hydroxamic chloride residue $$(-\underset{\underset{Cl}{|}}{C}=NOH)$$

in their molecules with tertiary amines in the presence of an aliphatic lower alcohol. This reaction can be expressed by the following equation:

$$N \equiv C - Ar - \underset{\underset{Cl}{|}}{C} = NOH \xrightarrow{R_3N} N \equiv C - Ar - C \equiv N \longrightarrow O$$

According to the process, the desired polymers can be produced merely by allowing said compounds to stand at room temperature in the solid state. However, the application of heat or irradiation of ultraviolet light and radiation may be effectively used to accelerate the reaction.

The polyoxadiazoles produced according to the process have the following structure:

$$N \equiv C - Ar - C \equiv N \rightarrow O \longrightarrow \left[ -Ar - C \underset{N-O}{\overset{N}{\diagup\!\!\!\diagdown}} C - \right]_n$$

wherein Ar is as defined above.

The polyoxadiazole produced according to this process has a high melting point and it is useful as a heat-resistant high molecular weight polymer.

The mechanism by which the proceeds should in no way be restricted by any particular theories. However, the reason why the polyoxadiazole is formed selectively by polyaddition reaction in solid state according to the process is presumed to be as follows:

Because of the tendency of nitrile group to attract electrons and the tendency of nitrile-N-oxide group to repel electrons, it is presumed that the molecules and electrons of the monomers are arranged in the crystal thereof as follows:

$$N \equiv C - Ar - C \equiv N \rightarrow O \cdots$$
$$\quad N \equiv C - Ar - C \equiv N \rightarrow O \cdots$$
$$\quad\quad N \equiv C - Ar - C \equiv N \rightarrow O \cdots$$

Therefore, each molecule cannot move freely in the crystal lattice and as a result, nitrile-N-oxides themselves may not react with each other but do react with the nitrile group adjacent thereto to form a stable polyoxadiazole.

The foregoing hypothesis is confirmed by the fact that an examination of the change in the infrared absorption spectrum of the product with the lapse of time in the course of reaction indicates that the absorptions of the nitrile group and the nitrile-N-oxide group both decrease at the same rate.

The following examples illustrate the present invention in more detail.

EXAMPLE 1

To a solution of 0.500 g. of p-cyanobenzhydroxamic acid chloride in 5 ml. of methanol were slowly added 5 ml. of a methanolic solution containing 0.280 g. of triethylamine. Then, the crystals which formed in the solution were filtered and washed with methanol. As a product, p-cyanobenzonitrile-N-oxide was obtained in a yield of 70% of the theoretical amount.

Upon allowing the resulting p-cyanobenzonitrile-N-oxide to sand at room temperature for 53 days, it changed to a polymer having a melting point of 360° C.

EXAMPLE 2

The polymer obtained in Example 1 was heated gradually in air with the temperature being raised to 250° C. in 1 hour, and was further heat-treated at that temperature for 2 hours.

A polymer having a melting point of more than 360° C. and an inherent viscosity of 0.75 as measured at a concentration of 0.2 g. per 100 ml. of concentrated $H_2SO_4$ at 30° C. was produced.

What we claim is:
1. A process for preparing a polyoxadiazole consisting of recurring units of the formula

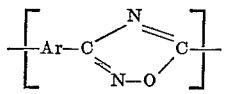

wherein Ar is phenylene or naphthylene, said process comprising subjecting a compound of the formula:

wherein Ar is as defined above to a 1,3-dipolar cycloaddition reaction by allowing same to stand at room temperature or by heating same at a temperature up to 250° C.

2. A process as claimed in claim 1 wherein said compound is p-cyanobenzonitrile-N-oxide, m-cyanobenzonitrile-N-oxide, or 5-cyano-1-naphthonitrile-N-oxide.

3. A process as claimed in claim 1 wherein the 1,3-dipolar cycloaddition reaction is effected in the solid state.

References Cited

UNITED STATES PATENTS 3,213,068   10/1965   Frazza _____ 260—79.3
3,044,994   7/1962    Blomstrom _____ 260—78

OTHER REFERENCES

Wiley et al., "Jour. Organic Chem.," vol. 25 (April 1960), pp. 546–551.

Eloy, "Bull. Soc. Chim. Belg.," vol. 73 (1964), pp. 639–640.

Overberger et al., "Polymer Letters," vol. 3 (September 1965), pp. 735–738.

Akiyama et al., "Polymer Letters," vol. 4 (May 1966), pp. 305–308.

SAMUEL H. BLECH, Primary Examiner

U.S. Cl. X.R.

204—159.11; 260—78, 78.4, 465